Aug. 2, 1932.  L. C. HUCK  1,869,562
ADJUSTING MEANS FOR LEVER ARMS
Filed Nov. 19, 1928
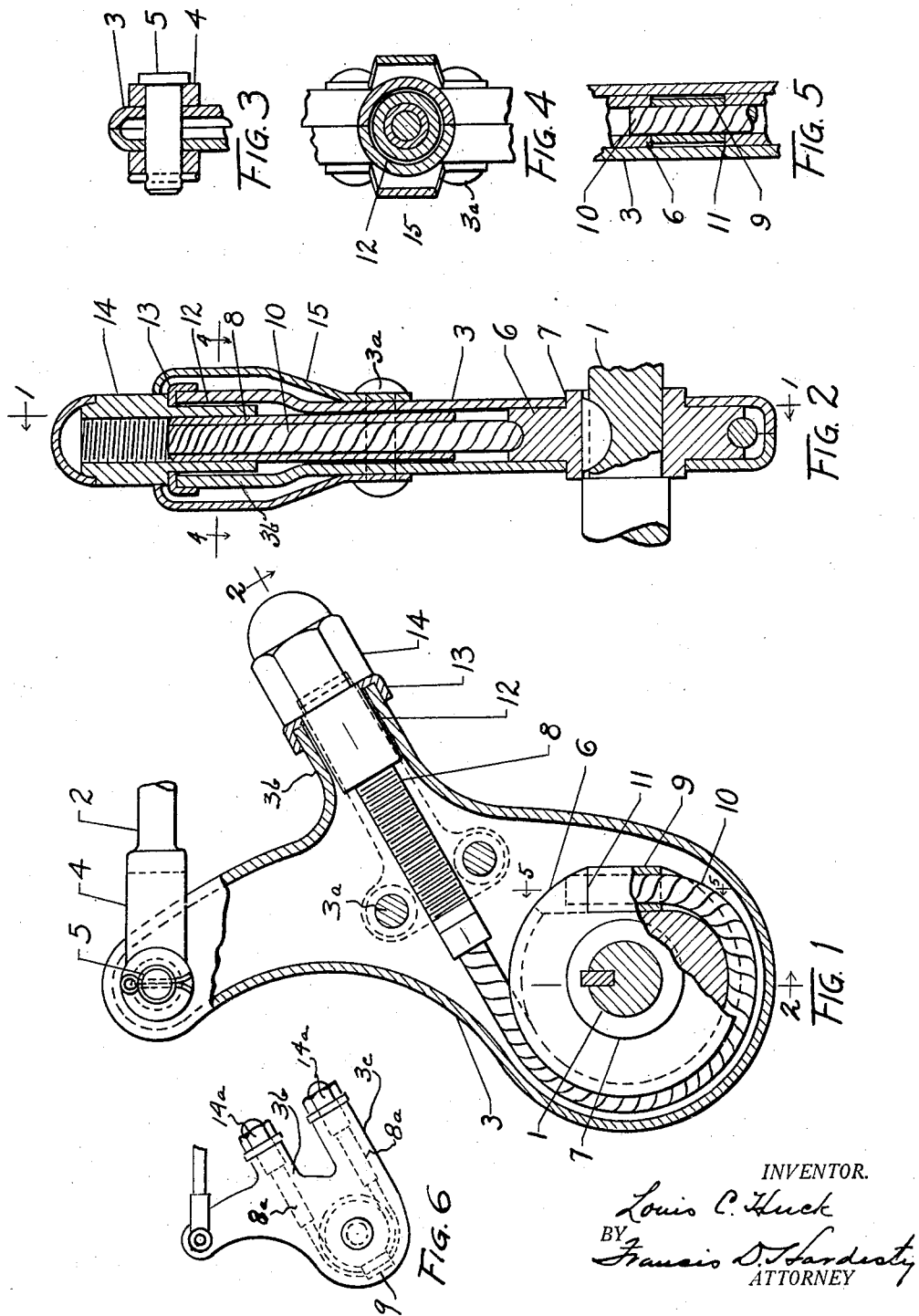

Patented Aug. 2, 1932

1,869,562

UNITED STATES PATENT OFFICE

LOUIS C. HUCK, OF DETROIT, MICHIGAN

ADJUSTING MEANS FOR LEVER ARMS

Application filed November 19, 1928. Serial No. 320,505.

The present invention relates to means for connecting lever arms to rotatable shafts and to adjustments therefor whereby the angular positions of said arms on said shafts may be accurately and easily made.

Among the objects of the invention is a novel and improved connection of this character which is capable of being adjusted with facility even though the degree of adjustment required may be relatively slight and when so adjusted it will positively hold or lock the shaft and arm in fixed angular relation.

Another object is a mechanical connection of this character which is capable of adjustment without requiring relative separation of parts and which is compact and inexpensive to manufacture and assemble.

Still other objects will readily occur to those skilled in the art by reference to the following description and the accompanying drawing in which Fig. 1 is a vertical section on line 1—1 of Fig. 2.

Fig. 2 is a section on line 2—2 of Fig. 1.

Fig. 3 is a section showing the connection of the operating link to the lever.

Fig. 4 is a section on line 4—4 of Fig. 2.

Fig. 5 is a section on line 5—5 of Fig. 1.

Fig. 6 is a side elevation of a modification showing the adjusting means acting positively in both directions.

The present device is suitable for use in many different mechanisms but as an example of one of its applications there has been chosen vehicle brake mechanism as a specific example and particularly that portion of the brake in which, for example, the brake operating cam shaft is rotated by a short lever embodying the invention.

In brake operating mechanism of the present day automobile it is desirable to provide an adjustment which will not change the angular relation of the various levers and rods. Such adjustment is illustrated herein. Such a function among others is desirable in order to compensate for the wear of the brake bands or lining.

Referring to the drawing in Fig. 1, a shaft 1, which may be the cam shaft above referred to, is arranged to be rotated by a pull on the rod 2 which is attached to the lever 3 by means of a clevis 4 and a clevis pin 5. In the construction shown, a sheave 6 is keyed or splined to the shaft 1 and provided with shoulders 7 forming a hub upon which is mounted the lever 3 in such way as to be rotatable on the sheave. In the present construction the lever 3 is shown as formed of sheet metal in two parts secured together by rivets 3a, which parts enclose the sheave 6 and the cooperating members to be described and may be arranged to offer frictional resistance against relative movement of the lever and sheave.

The lever 3 is provided at one side with a tubular extension 3b open to the space within the lever and into this extension projects the end of a threaded stud 8 which at its inner end is attached to a short piece of cable 10 arranged to pass around the sheave in the groove thereof and have its other end fixed to the sheave. The method of securing the end of the cable to the sheave is shown in Fig. 5. In this figure the sheave is shown as recessed as at 11 and the cable 10 is provided with a sleeve 9 fixed thereto by brazing or any other suitable means, which sleeve drops into the recesses 11 which prevent longitudinal movement of the cable.

The threaded stud 8 extends to the end of the tubular extension 3b and into the nut 14 which is rotatably mounted therein. It is preferred to place a small flanged washer 13 on the end of the extension as a bearing member for the nut, and to provide the nut 14 with a shoulder resting on this washer.

It will readily be noted that the rotation of the nut 14 in the take-up direction will exert a pull on the sheave and thereby tend to move the lever 3 angularly with respect to shaft 1. In the present example, lever 3 is fixed in position by rod 2, and therefore the sheave 6 must rotate instead and thereby move the shaft 1 to a new angular relation with respect to the lever.

In order to preserve the adjustment accomplished through rotation of nut 14 it is preferred to secure to the sides of the lever 3, spring fingers 16 which extend up to the nut and press against the flattened faces thereof so as to prevent rotation.

Fig. 6 illustrates one mode of applying the principles of the invention in cases where a positive adjustment in two directions may be desirable or necessary. In this figure the parts are shown as similar except that there are two tubular extensions 3b and 3c and the flexible element will have a threaded stud 8a at each end with the sleeve 9 fixed to its mid portion. Adjustment may then be made by loosening one nut 14a and taking up on the other.

While a cable has been shown as the preferred flexible element for the adjusting device, it is obvious that any other flexible element of sufficient tensile strength and resistance to elongation could be used and such is indeed contemplated. A band of spring steel is suggested as one of the substitutes for the cable.

Now having described the invention and the preferred forms of embodiment thereof, it is to be understood that the said invention is to be limited, not to the specific details herein set forth but only by the scope of the claims which follow.

I claim:

1. In combination, a shaft having a sheave fixed thereto, a lever enclosing said sheave and rotatable with respect thereto, said lever having a lateral opening therein, a flexible element fixed to said sheave and passing around the same and having its free end adjacent said opening, a threaded stud fixed to the free end of said element, and a rotatable nut fixed in said opening and threaded on said stud whereby rotation of said nut varies the length of said element.

2. A shaft, a hub fixed thereon, said hub having a plurality of annular shoulders, a lever enclosing said hub and having parts mounted for rotation about said shoulders, and means to adjust the lever relative to the hub and shaft, said means comprising a flexible element partially surrounded and secured to said hub, and mechanism to adjustably secure said flexible element to said lever.

3. A shaft, a hub fixed thereto, a lever enclosing said hub and rotatable about the axis of said shaft, a flexible member partially surrounding said hub and having one end secured thereto, means adjustably connecting the other end of said flexible member to said lever.

LOUIS C. HUCK.